US011798251B2

(12) United States Patent
Plasek et al.

(10) Patent No.: US 11,798,251 B2
(45) Date of Patent: Oct. 24, 2023

(54) OBJECT IDENTIFICATION SYSTEM WITH REDUCED SERVICE CALLS

(71) Applicant: Unisys Corporation, Blue Bell, PA (US)

(72) Inventors: James Plasek, St. Paul, MN (US); Mark Rosno, Minneapolis, MN (US); Shardul Patil, San Diego, CA (US); Hayden Donze, Orange, CA (US); Max Hirsch, Glenside, PA (US)

(73) Assignee: Unisys Corporation, Blue Bell, PA (US)

( * ) Notice: Subject to any disclaimer, the term of this patent is extended or adjusted under 35 U.S.C. 154(b) by 553 days.

(21) Appl. No.: 17/066,898

(22) Filed: Oct. 9, 2020

(65) Prior Publication Data

US 2022/0114360 A1 Apr. 14, 2022

(51) Int. Cl.
*G06V 10/22* (2022.01)
*G06V 40/16* (2022.01)

(52) U.S. Cl.
CPC ............ *G06V 10/22* (2022.01); *G06V 40/172* (2022.01); *G06V 40/179* (2022.01)

(58) Field of Classification Search
CPC ........ G06V 10/22; G06V 10/25; G06V 10/82; G06V 40/172
See application file for complete search history.

(56) References Cited

U.S. PATENT DOCUMENTS

2021/0027602 A1* 1/2021 Correnti ............... G08B 29/188

* cited by examiner

*Primary Examiner* — Sam Bhattacharya

(57) ABSTRACT

Methods and systems for implementing an object identification system equipped to reduce the number of service calls for remote object identification lookups are disclosed. The object identification management server works to reduce the number of object identification requests, which overall improves the process of quickly and accurately providing object identifications when needed and without unnecessarily wasting computing resources. The object identification server can subsequently manage the number of identification requests by setting a tunable threshold, which allows a system to operate more efficiently and allocate computing resources accordingly.

22 Claims, 7 Drawing Sheets

OBJECT IDENTIFICATION SYSTEM WITH REDUCED SERVICE CALLS

BACKGROUND

Currently, object identification systems exist which are provided image data and which may return information describing the contents of such images. For example, facial identification systems may return a determined identity of a user (e.g., based on comparison of facial features that are identifiable in image data to a database of existing user identities and associated facial features using a trained machine learning model). In some cases, user identities are returned alongside a confidence level, indicating an estimated accuracy of the identification provided by that facial recognition service. In general, access to such object identification systems is performed over the internet, with access being provided via a publicly-accessible application programming interface (API).

Although object identification systems may be used by large-scale cloud providers (e.g., Google, Amazon, Microsoft) to enhance image or video content, for third-party video systems, it can be difficult to manage real-time or near real-time object identification. This is because, for video content, the object would need to be identified in each frame, with an object recognition request and response taking more time than would be allotted given the desire for near real-time playback of video data that includes object identification.

Additionally, such object identification system providers may deprioritize object identification requests received via the API, or may at the very least load-balance those requests such that a very high volume of object recognition requests may consume a large amount of bandwidth (in the form of image data sent to the object identification service and information returned in response) as well as processing power of the object identification system provider.

In the context of facial identification specifically, although relatively low-cost localized facial recognition systems exist (e.g., systems that recognize the presence of a human face in an image), the process of providing identification for those individuals appearing in image data is not feasible for all video capturing entities to manage locally. Because fast, accurate facial identification is of significant value in the context of security services and user services (e.g., providing concierge services to a user who may appear at a business), improvements in methods of quickly, efficiently, and accurately providing object, and particularly facial, identification are desirable.

SUMMARY

In summary, the present disclosure relates to system and methods for implementing an object identification system equipped to reduce the number of service calls for remote object identification lookups.

In a first aspect, a system for an object identification management server comprised of a processor and memory implementing an object identification service is disclosed. The system includes a processor that executes stored instructions from the memory to implement an object identification service. The system further includes an object identification service that executes an object detection algorithm on each frame of the video content to detect objects that appear within the frame. For each frame in which an object is detected, the object identification service will determine whether the object corresponds to an identified object present in a preceding frame using an object tracking algorithm. If it is determined that the object is not identified in a preceding frame, the object identification service will call a remote object identification interface to obtain an identification of the object, and depending on whether the object received an identification, will associate the identification of the object with the object in the frame. If it is determined that the object is present and identified in the preceding frame, the object identification service will associate an identification of the object from the preceding frame with the object in the frame without requiring the object identification service to call the remote object identification interface to identify the object in the frame.

In a second aspect, a system for facial identification useable to identify persons appearing within video content is disclosed. The system includes a computing system having a communication interface comprising a processor and a memory communicatively connected to the processor. The memory stores instructions which, when executed by the processor, implements a facial identification service. The system further includes a facial identification service which executes an object detection algorithm on each frame of the video content to detect objects that appear within the frame, including at least one face object representative of a face of a person. For each frame in which a face object is detected, the facial identification service will determine whether the face object corresponds to an identified face object present in a preceding frame using an object tracking algorithm. If it is determined that the face object is not identified in a preceding frame, the facial identification service will call a remote facial identification interface to obtain an identification of a person based on the face object, and depending on whether the face object received an identification, will associate the identification of the face object with the object in the frame. If it is determined that the face object is present and identified in the preceding frame, the facial identification service will associate an identification of the object from the preceding frame with the object in the frame without requiring the facial identification service to call the remote facial identification interface to identify the face object in the frame.

In a third aspect, a method of transferring data from an entity to a processing server is disclosed. The method includes, within a computer system environment, the processing server receiving video data generated from the entity's video capture system, the processing server comparing accessible records owned by the entity provided to the third-party from previously provided photos, and performing an object detection algorithm on each frame of the video content to detect objects that appear within the frame, including at least one face object representative of a face of a person. For each frame in which a face object is detected, the facial identification service will determine whether the face object corresponds to an identified face object present in a preceding frame using an object tracking algorithm. If it is determined that the face object is not identified in a preceding frame, the facial identification service will call a remote facial identification interface to obtain an identification a person based on the face object, and depending on whether the face object received an identification, will associate the identification of the face object with the object in the frame. If it is determined that the face object is present and identified in the preceding frame, the facial identification service will associate an identification of the object from the preceding frame with the object in the frame without requiring the facial identification service to call the remote facial identification interface to identify the face object in the frame.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
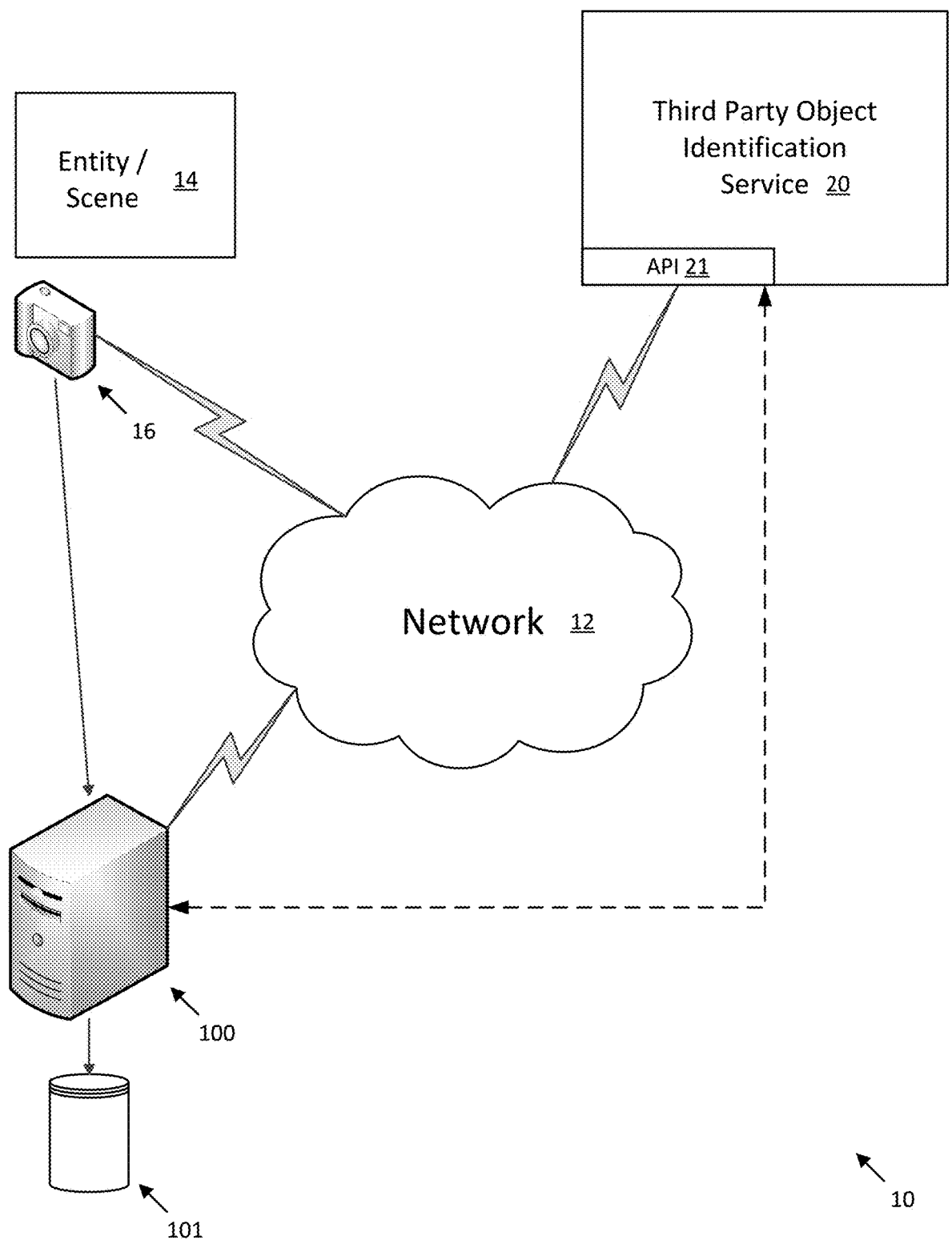
FIG. 1 illustrates an example computing environment including a computing system, network, entity, processing server, and object identification service, in which aspects of the present disclosure can be implemented.

Embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Embodiments of the present invention are directed to methods and systems for an object identification system equipped to reduce the number of service calls for remote object identification. A reduced service call can be useful in an assortment of situations where effective and efficient identification is essential, but where service calls associated with each frame of image or video content is untenable, e.g., where identification in near-realtime is required, or where bandwidth may be limited (e.g., at remote or inconvenient locations to have a high-bandwidth video connection). This is advantageous because conventional object identification systems often require a very high volume of object identification requests, which may consume a large amount of bandwidth (in the form of image data sent to the object identification service and information returned in response) as well as the processing power of the object identification system provider. The ability to reduce service calls diminishes the number of object identification requests which overall improves the process of quickly and accurately providing object identifications without unnecessarily wasting computing resources. In that case of video content, it can be computationally complex to submit every frame of a video as an image to a facial identification service. Additionally, in the case of software as a service, such submissions are not only computationally complex but also cost-prohibitive. Accordingly, it is advantageous to reduce the number of times in which a facial identification service is utilized while ensuring that all individuals appearing in that video are identified (to the extent possible).

Examples of such scenarios may include, for example, use of video capture devices for facial identification in instances where prompt individual identification is required, such as boarding a plane, accessing a building, or recognizing significant individuals.

In accordance with some aspects of the present disclosure, image data, such as video data having a plurality of frames, may be analyzed using lower-cost, computationally simple object detection software (e.g., software that recognizes the presence of a particular object, but which may not be able to uniquely identify that object). For example, object detection software may include facial detection software, where facial identification is ultimately desired. If the object is detected using such software in a given frame of image data, that frame may be submitted to an object identification service. The object identification service may respond with an object identity and optionally a confidence score regarding the object identity. If the confidence score is above a predetermined threshold (e.g., the service is "reasonably" confident in the identity of the object), the identity may be associated with the image data. Such image data may then be displayed alongside the object identity.

For subsequent video frames, rather than submitting each sequential frame, the object may be tracked using the object detection software without requiring subsequent calls to object identification services. If an object remains within a frame in subsequent frames, the attributed identity from the prior frame may be carried forward to subsequent frames without requiring triggering a call to the object identification service for each frame.

In the context of facial identification systems, a video can be analyzed using facial detection software and object tracking algorithms. A facial object may be detected when it appears in video. If the object is a recognizable face, a frame including the object may be submitted to a facial identification service. Subsequently, an object tracking process may be used to track the movement of the face object within the video (e.g., between frames) without requiring those subsequent frames to be submitted to the facial identification service. Rather, because the recognized face would be an identified object within a frame, it may be inferred that the individual identified by the facial identification service remains within the video based on an earlier frame identifying the individual based on facial detection and subsequent object tracking associated with that individual's face. In this way, a single identity for each face may be maintained from a first point in time when that faces detected until the face exits the video. Accordingly the number of calls to a facial identification service may be significantly reduced as compared to frame by frame analysis.

Referring to FIG. 1, an example environment 10 in which aspects of the present disclosure can be implemented is shown. The environment 10 includes a processing server 100, an entity operating environment 14, an entity's image capture system 16, and a third-party object identification service 20. In the example shown, the server 100, image capture system 16, and third party object identification service 20 may be communicatively connected via a network 12, such as the Internet.

The processing server 100 can be an object identification management server and can host a database 101 storing various information such as historical video content, a historical index of dates/times of appearance of various objects within video content, training objects that may be submitted to the third party object identification service 20 for training that service to accurately identify specific objects, and various other information. In example embodiments, the third party object identification service 20 will receive an identifier of an object and one or more training images associated with that identifier from the database 101, thereby allowing the service to accurately identify particularized objects upon receipt of queries from the processing server 100 and/or image capture system 16.

The entity 14 can be any variety of individuals or establishments, such as retail, educational, business, public, or private place that has some sort of relation with or knowledge of the information to be verified. In some examples, entity 14 manages and controls the image capture system 16. The entity may be, for example, an airport or airport security organization, a business where security is desirable (e.g., a bank or financial institution), or any other location at which object or user identification may be useful.

The image capture system 16 can include any of a variety of devices, such as using a digital camera or digital video capture device, or any other computer-readable or computer storage medium device with capabilities for capture of image data. The image capture system 16 may include, for example, one or more cameras, such as security cameras capturing real-time video, or other types of camera systems capturing any other type of video or sequential-frame image content.

The third-party object identification service 20 can include any of a variety of services, such as identification of objects. The third-party object identification service 20 may receive data from the processing server 100, or alternatively may receive requests for image identification, via an API call made from the processing server 100 and/or the video capture system 16. The third-party object identification service 20 can therefore include an application programming interface (API) that is callable from a remote system. A remote system may provide image data representing all or a portion of an image, and may receive in response an indication of an identity of one or more objects in the image, as well as a confidence level associated with the identification of the object in the image.

In example embodiments, a process for identifying objects within video content is performed either at the processing server, at the video capture system, or some combination thereof, to manage the extent to which calls are made to the third-party object identification service 20. As noted above, the third-party object identification service 20 is not called at every frame provided by the video capture system 16 to the processing server 100. The third-party object identification service 20 may be remotely located from the processing server 100.

Figure 2:
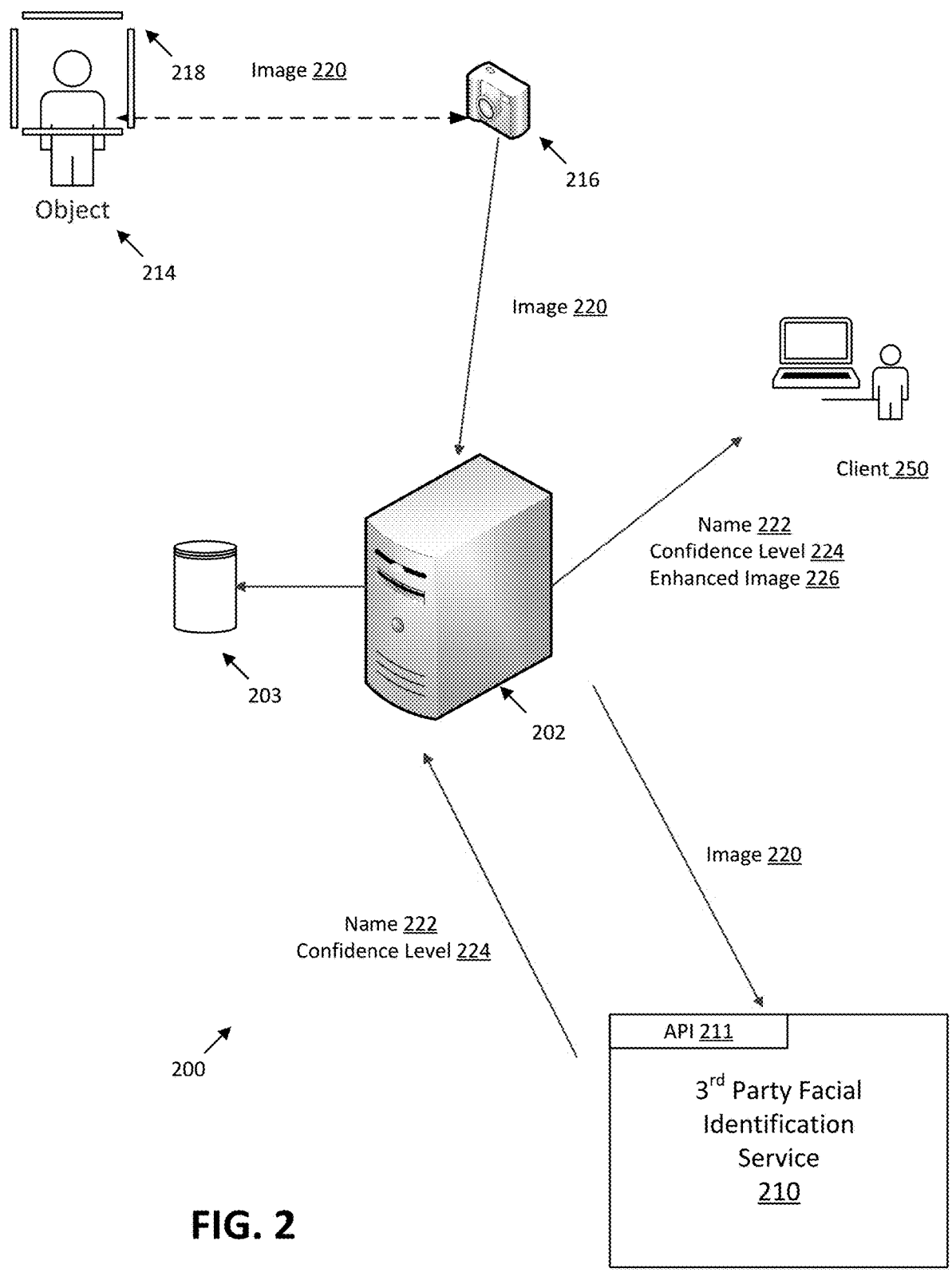
FIG. 2 illustrates a sequence of operations performed among systems within a particular embodiment of the example computing environment of FIG. 1, reflecting an environment in which service calls to a third party facial identification service may be reduced.

Referring now to FIG. 2, an example implementation of an object identification process is depicted within a particularized exemplary environment 200. In the example shown, the object identification process provides facial identification, and manages calls to a third party facial identification service 210.

As depicted in FIG. 2, the exemplary environment 200 includes a processing server 202 that hosts any database 203 storing video content, historical records of individuals identified in video content, and optionally image data providing training images of individuals to be identified by a third party service. The training images of individuals, associated with individual identifiers (e.g., user names or user identifiers that are linked in the database 203 to user names) are provided to the third party facial identification service 210.

The processing server 202 interfaces with an image capture system 216, the third party facial identification service 210, and one or more client devices 250. The image capture system 216 and third party facial identification service 210 operate generally analogously to those components as described in conjunction with FIG. 1, but specifically configured for facial identification.

In the example shown, the image capture system 216 is positioned to capture images, such as video images, of a scene that may include at least one object 214. In the example, the object 214 is an individual. The video images may include a plurality of frames, one or more of which may include an image of the objects 214, e.g., a face of an individual. The image capture system 216 may then forward that image data 220 to the processing server 202.

At either the image capture system 216 or the processing server 202, an object detection algorithm may be executed to detect an object in any frame of the image data 220. For example, the object detection algorithm may be a facial detection algorithm. Notably, a facial detection algorithm may be executable at an image capture system 216 or processing server 202, but typically such a facial detection algorithm is incapable of uniquely identifying individuals. Rather, such an algorithm may simply detect the presence of a human face.

Although in the example shown the image capture system 216 forwards image data 220 to the processing server 202, in alternative embodiments the image capture system 216 may be either partially integrated with the processing server 202 or may otherwise directly communicate with the third party facial identification service 210.

Accordingly, upon capture of the image data 220, and optionally transmission of the image data to the processing server 202, image data may selectively be submitted to the third party facial identification service 210, for example via API 211. The determination of whether to submit a portion of (e.g., a frame or portion thereof) the image data 220 to the third party facial identification service 210 may be performed either by the image capture system 216 or the processing server 202, in accordance with an analysis of the image data and individuals previously identified in other portions (e.g., frames, or portions thereof) of the image data 220. An example process for determining whether to submit image data for purposes of user identification based on facial detection is described in further detail below in conjunction with FIG. 4.

In general, if the third party facial identification service 210 is provided image data 220 the service 210 may respond to the processing server 202 (or optionally the image capture system 216) by providing an identifier of the individual, such as a name 222. The service 210 may also supply a confidence level 224 alongside the identifier, indicating a likelihood of accuracy of the identification of the individual. In example embodiments, the identifier may be a name of the individual and the confidence level 224 may be a normalized numerical value (e.g., between zero and one).

Upon receipt of the identifier and confidence level, the processing server 202 (or image capture system 216) may supply a near-realtime video output to a display, for example at a client 250. The video output optionally includes information provided by the third party facial identification service 210, i.e., the name 222 and confidence level 224 of an individual whose face appears in the video content. Additionally, the processing server 202 may modify the video content by incorporating an overlay annotating the video content with identifying information of the individual. Example illustrations of such identification are provided below in conjunction with FIGS. 5-10.

In some embodiments, and as discussed below, the modified video content 226 may selectively include a name or identifier of the individual based on whether the confidence level 224 exceeds a threshold set at the processing server 202. Additionally, the frequency with which requests are submitted to the third party facial identification service 210 from the processing server 202 may be affected by the confidence level, as well as a timing threshold, outside of which user identity should be refreshed. Details regarding such thresholds are provided in conjunction with FIG. 4 and the example process described below.

Figure 3:
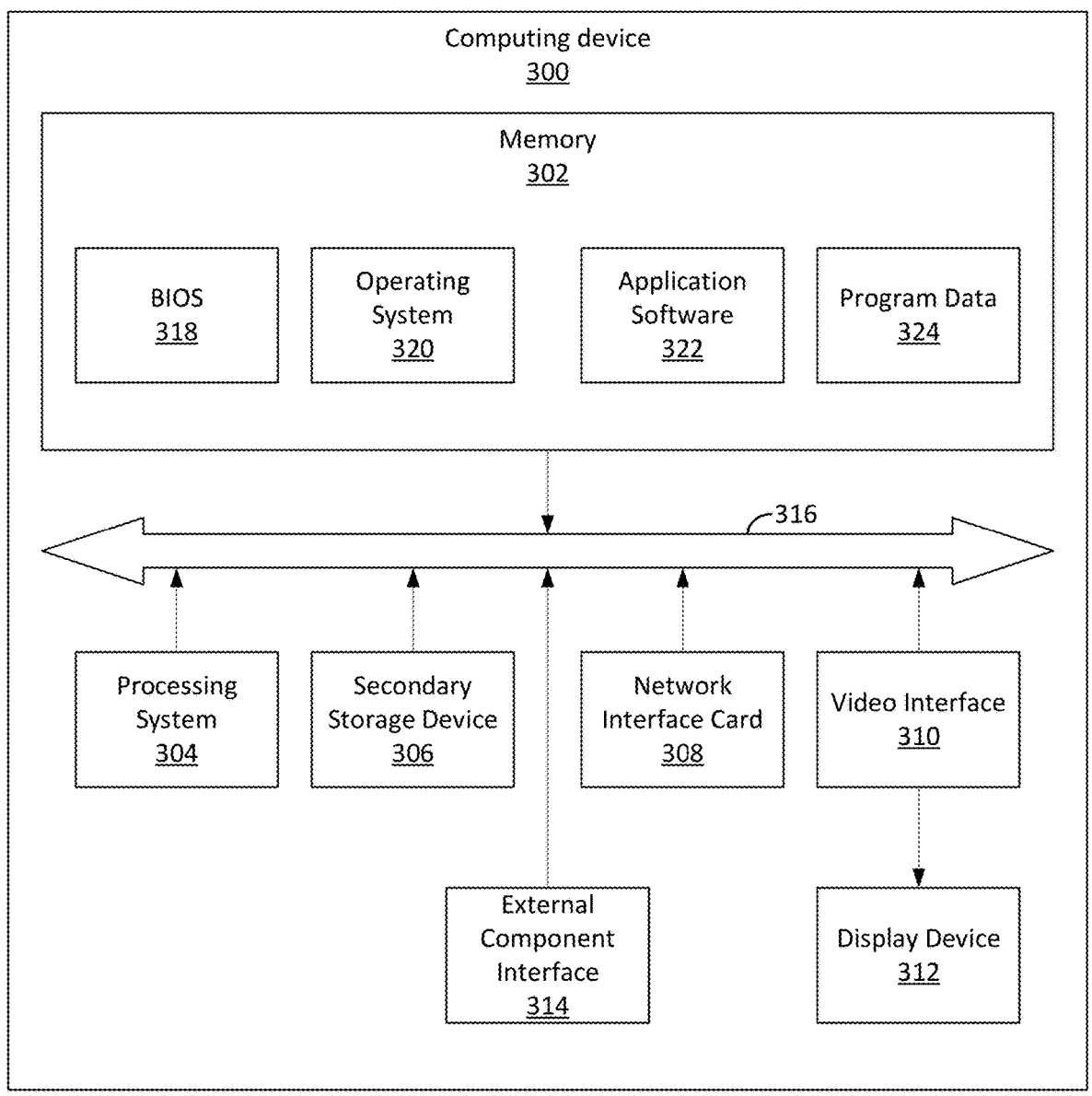
FIG. 3 is a schematic block diagram of a computing system in which aspects of the present disclosure can be implemented.

Referring now to FIG. 3, a schematic illustration of an example discrete computing system in which aspects of the present disclosure can be implemented. The computing device 300 can represent, for example, a computing system operable as the processing server 100, 202, third party object identification service 20, third party facial identification service 210, or even a portion of the image capture system (with camera components excluded). In particular, the computing device 300 represents the physical construct of an example computing system at which an endpoint or server could be established.

In the example of FIG. 3, the computing device 300 includes a memory 302, a processing system 304, a secondary storage device 306, a network interface card 308, a video interface 310, a display unit 312, an external component interface 314, and a communication medium 316. The memory 302 includes one or more computer storage media capable of storing data and/or instructions. In different embodiments, the memory 302 is implemented in different ways. For example, the memory 302 can be implemented using various types of computer storage media.

The processing system 304 includes one or more processing units. A processing unit is a physical device or article of manufacture comprising one or more integrated circuits that selectively execute software instructions. In various embodiments, the processing system 304 is implemented in various ways. For example, the processing system 304 can be implemented as one or more physical or logical processing cores. In another example, the processing system 304 can include one or more separate microprocessors. In yet another example embodiment, the processing system 304 can include an application-specific integrated circuit (ASIC) that provides specific functionality. In yet another example, the processing system 304 provides specific functionality by using an ASIC and by executing computer-executable instructions.

The secondary storage device 306 includes one or more computer storage media. The secondary storage device 306 stores data and software instructions not directly accessible by the processing system 304. In other words, the processing system 304 performs an I/O operation to retrieve data and/or software instructions from the secondary storage device 306. In various embodiments, the secondary storage device 306 includes various types of computer storage media. For example, the secondary storage device 306 can include one or more magnetic disks, magnetic tape drives, optical discs, solid state memory devices, and/or other types of computer storage media.

The network interface card 308 enables the computing device 300 to send data to and receive data from a communication network. In different embodiments, the network interface card 308 is implemented in different ways. For example, the network interface card 308 can be implemented as an Ethernet interface, a token-ring network interface, a fiber optic network interface, a wireless network interface (e.g., WiFi, WiMax, etc.), or another type of network interface.

The video interface 310 enables the computing device 300 to output video information to the display unit 312. The display unit 312 can be various types of devices for displaying video information, such as an LCD display panel, a plasma screen display panel, a touch-sensitive display panel, an LED screen, a cathode-ray tube display, or a projector. The video interface 310 can communicate with the display unit 312 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 314 enables the computing device 300 to communicate with external devices. For example, the external component interface 314 can be a USB interface, a FireWire interface, a serial port interface, a parallel port interface, a PS/2 interface, and/or another type of interface that enables the computing device 300 to communicate with external devices. In various embodiments, the external component interface 314 enables the computing device 300 to communicate with various external components, such as external storage devices, input devices, speakers, modems, media player docks, other computing devices, scanners, digital cameras, and fingerprint readers.

The communication medium 316 facilitates communication among the hardware components of the computing device 300. In the example of FIG. 3, the communications medium 316 facilitates communication among the memory 302, the processing system 304, the secondary storage device 306, the network interface card 308, the video interface 310, and the external component interface 314. The communications medium 316 can be implemented in various ways. For example, the communications medium 316 can include a Peripheral Component Interconnect (PCI) bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing System Interface (SCSI) interface, or another type of communications medium.

The memory 302 stores various types of data and/or software instructions. For instance, in the example of FIG. 3, the memory 302 stores firmware, such as a Basic Input/Output System (BIOS) 318 and an operating system 320. In the example shown, the BIOS 318 includes a set of computer-executable instructions that, when executed by the processing system 304, cause the computing device 300 to boot up. The operating system 320 includes a set of computer-executable instructions that, when executed by the processing system 304, cause the computing device 300 to provide an operating system that coordinates the activities and sharing of resources of the computing device 300. Furthermore, the memory 302 stores application software 322. The application software 322 includes computer-executable instructions, that when executed by the processing system 304, cause the computing device 300 to provide one or more applications. The memory 302 also stores program data 324. The program data 324 is data used by programs that execute on the computing device 300. Example program data executable at the computing device may implement some or all aspects of the process 400 described below in conjunction with FIG. 4.

Although particular features are discussed herein as included within a computing device 300, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal.

By way of example, and not limitation, communication media may include wired media such as a wired network or direct-wired connection, and wireless media such as acoustic, radio frequency (RF), infrared, and other wireless media. Computer storage media does not include a carrier wave or other propagated or modulated data signal. In some embodiments, the computer storage media includes at least some tangible features; in many embodiments, the computer storage media includes entirely non-transitory components.

It is noted that, although in the embodiments of FIGS. 1-3 shown, the computing devices represent a physical computing system; the various endpoints and servers of the present disclosure need not be directly implemented on a hardware-compatible system. Rather, such endpoints or servers could be implemented within a virtual computing system or virtual partition of a computing system. In some embodiments, the endpoints and/or servers of the present disclosure are implemented in a partitioned, multiprocessor environment, with the various partitions in which endpoints and/or servers reside being managed by a system virtualization software package.

Figure 4:
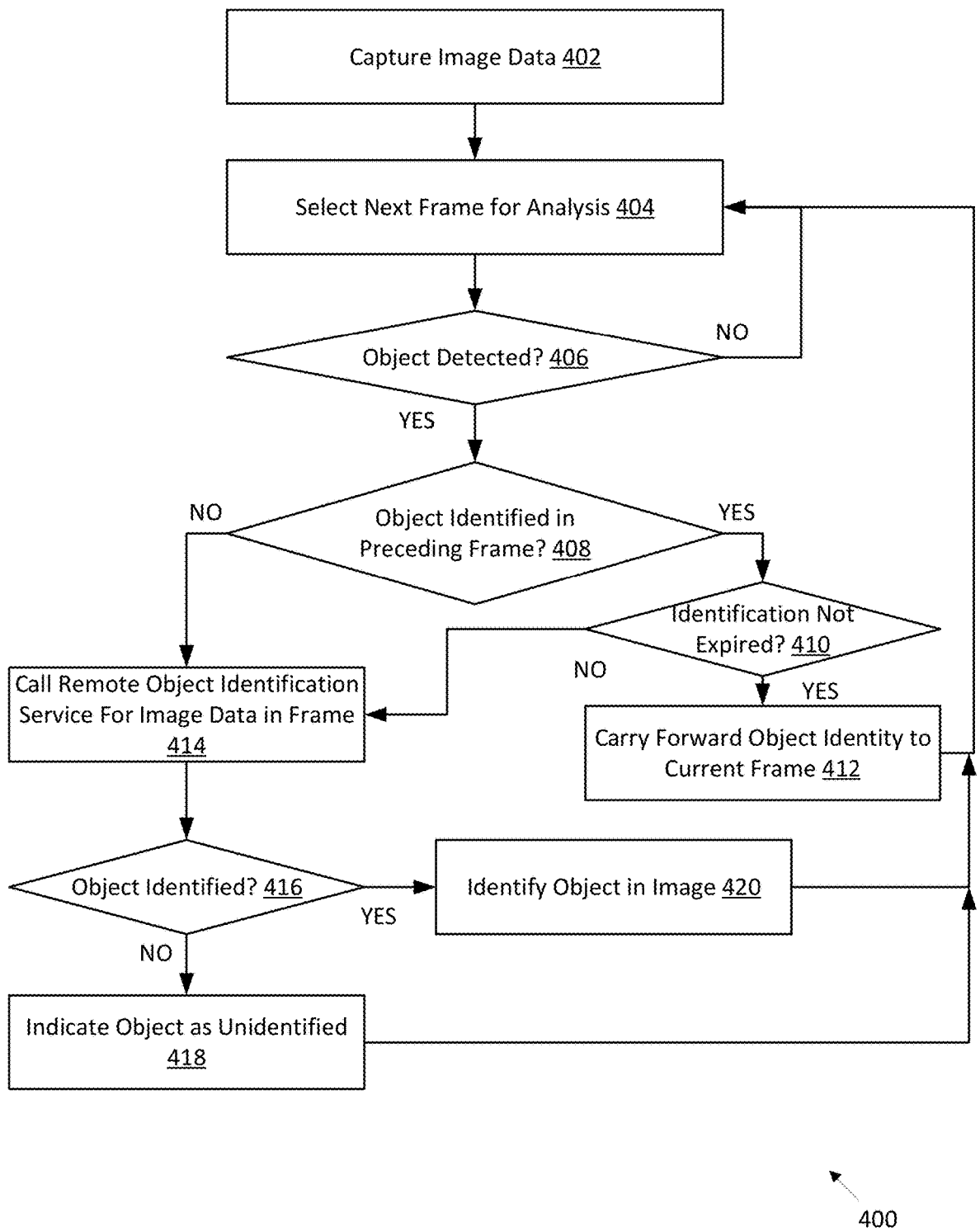
FIG. 4 illustrates a flowchart of an example method of performing object identification within image content, according to an example embodiment of the present disclosure.

Referring now to FIG. 4, a particularized process 400 is illustrated for identifying objects, such as individuals, within image data, and tracking such individuals or objects within subsequent image data with reduced identification service calls. The process 400 described herein can be implemented, for example, at least in part at an image capture system and/or a processing server as described above in conjunction with FIGS. 1-3.

In the example shown, the process 400 is initiated upon capturing image data (step 402). This may be performed, for example, by an image capture system such as described above. The image data captured may include a series of images, such as a series of frames in video data.

At any time after the capturing of image data has started (e.g., either concurrently or after capture of image data is completed) the process 400 includes selecting a frame for analysis (step 404). The frame selected may be an initial frame of the image data in a time series collection of frames, or may be some frame captured at a designated time at which object identification is desired to begin.

An object detection process (operation 406) is performed on the frame under consideration. The object detection process may include, for example, processing the image data using an existing object detection algorithm, such as the OpenCV Face Recognition tool. Other types of facial detection algorithms may be used for facial detection, and for example embodiments where other objects are detected, still other object detection methodologies may be used as well. Additionally, one or more further image processing techniques (e.g., a Haar filter) may be used for image filtering.

In the example shown, zero or more objects (or objects of a particular type) may be detected. If no object is detected in the current frame, operational flow proceeds to step 404, to select a next sequential frame of the video content for processing. If an object is detected, operational flow proceeds to determine of the object was identified in a preceding frame at step 408. This may be based on, for example, tracking objects detected in preceding frame, using a Kalman filter to determine similar objects in preceding, adjacent frames.

Optionally, although not seen in FIG. 4, if an object is detected, a processing server or other device that executes the object detection algorithm can apply an overlay on image data in near-realtime, such as a bounding box around the object. In this instance, the bounding box may be unlabeled, if the object has not yet been identified.

If the object has not been identified in a preceding frame (e.g., if an initial frame in which an object is detected, or in the event an object detected in the current frame does not correlate to an object in a preceding frame), a call to a third party remote object identification service (e.g., service 20 of FIG. 1, or in the case of facial identification, service 210 of FIG. 2) is made at step 414. This identification service call may be made to a service API (e.g., APIs 21, 211), such as described above in connection with FIGS. 1-2. The call may include image data that includes the object to be identified. For example, the image data provided to the identification service can include all of a particular frame under consideration, or only one or more portions of that frame that includes objects that have been detected and require identification.

The third party object identification service can, in some embodiments, return an identification of one or more objects included in the image data submitted for identification. In such example cases, the object identification can be a name of the object or can be an index to a particular object record that is associated with the object identity, for example which was used to train the third party object identification service, and which may be used to obtain a name of the object. The third party object identification service may also return a name of the object directly. Alongside the name or index to the name, the third party object identification service may return a confidence level in the object identification. In example embodiments, the confidence level corresponds to a normalized score between zero and one, with higher scores corresponding to greater confidence in an accurate object identification.

If the object has been identified in a preceding frame, at operation 410, it is determined whether the identification of that object has expired since the object was previously identified. An identification of the object may have expired based on, for example, a predetermined amount of time that may have elapsed since a last object identification has occurred for the particular object. For example, in some embodiments in which facial detection is performed, facial identification may be re-performed using a third party object identification service every predetermined number of seconds (e.g., every five seconds). In further embodiments, the predetermined amount of time is tunable, e.g., to adjust a rate of calls made to the third party object identification service.

If the identification of the object has not expired (e.g., the predetermined amount of time has not yet elapsed), the previous identification of the object in a preceding frame may be applied in the current frame, at step 412. For example, the current frame may have an overlay placed on that image data identifying the object and including a bounding box (to the extent not previously applied during operation 406). Operation may then return to select a next frame for analysis (at step 404) until all frames are exhausted. If the identification of the object has expired, the previous identification of the object is no longer considered "valid" and operational flow proceeds to step 414 at which a remote object identification service call is made to the third party object identification service as described above.

From the third party object identification service, i.e., once a response has been returned, for example either indicating (1) that the object is not identifiable at all, or (2) an object identity and a confidence level, it is determined whether the object has been successfully identified by the third party object identification service at operation 416. Successful identification of the object corresponds to receiving an identification of the object from the third party object identification service, and in some embodiments, corresponds to receiving that identification alongside a confidence level that is above a predetermined or preset threshold. For example, a response from the third party object identification service that includes an object or facial identification, but has a very low confidence level (e.g., below 0.4-0.5) may be designated as not adequately identified; as such, that object will not be associated with the returned identification at step 418.

However, if the object has an identification and a confidence level above the threshold, the object may be identified in the image data, at step 420. If the object is successfully identified, that object may be associated with an object identification at the processing server 100, 202. For example, the processing server may tag the frame of video data as including the identified object. The processing server may also create an overlay on the video data that identifies the object as having been identified and optionally displaying an identity of the object.

In some example implementations, an overlay provided on the image data may highlight an object upon detection of the object via the object detection process, and may provide a different overlay type including an identity for objects that have then been identified using the third party object identification service. One possible implementation for generation of overlays on image data that is subsequently displayed after being modified is provided below in conjunction with FIGS. 5-10.

Now referring to FIGS. 5-10, a sequence of images that are captured via an image capture system are illustrated in the form in which those images would be displayed following processing by the processing server to obtain object detection and object identification in a user identification context. The sequence of displayed images are depicted alongside object identification calls that may be made to a third party object identification service that has been trained with individual identifiers and training data including images of faces of the identified individuals.

Figure 5:
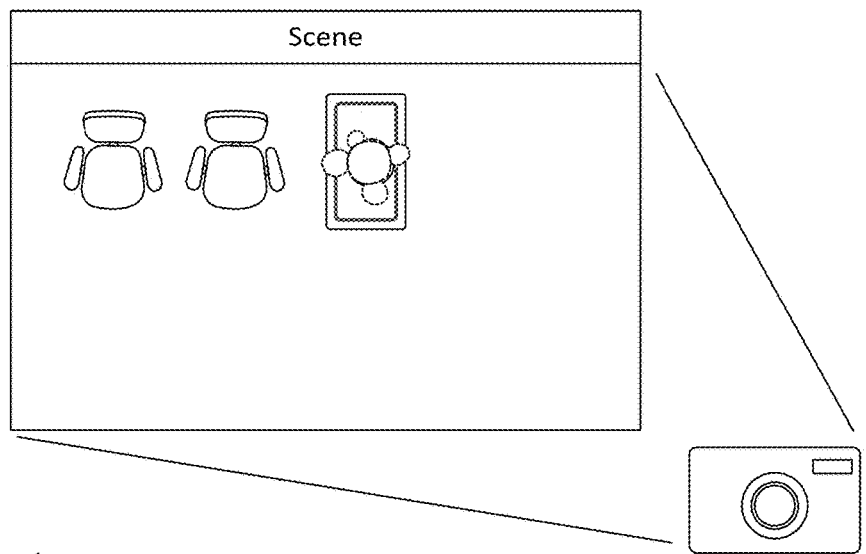
FIG. 5 illustrates a first frame of image content captured of a scene, which may be processed using an object or facial identification service.

Referring first to FIG. 5, a displayed image corresponds to a displayed version of a frame 500 of captured video content. The frame 500 may be displayed in realtime or near-realtime relative to when the frame was captured by an image capture system. In the example shown, the system is trained to identifier users by facial detection. Accordingly, the scene captured in the frame 500, including two chairs and a table having a plant positioned thereon, will not result in any objects being detected using the object detection process (e.g., the OpenCV algorithm, or similar solutions). Accordingly, no object identification process is also performed, and the frame 500 is unmodified relative to the original frame as captured.

Figure 6:
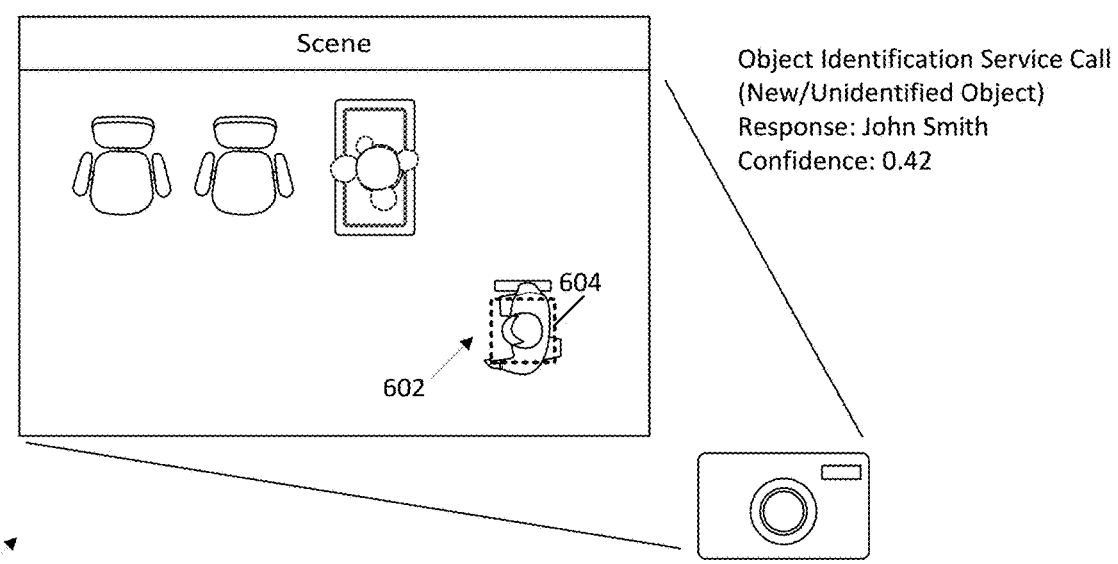
FIG. 6 illustrates a second frame of image content captured of a scene, which may be processed using an object or facial identification service.

Referring to FIG. 6, a further frame 600 is depicted. In this frame, an individual 602 has entered the field of view of the image capture system. The object detection process (e.g., as in operation 406 of FIG. 4) will detect that an object is present that may be identifiable. Because the object was not present in a prior frame of the image content, an object identification service call is made to a third party facial identification service, providing that service with either the entire frame or at least the portion of the image containing the detected facial object. As noted above, because that third party facial identification service was previously trained with face image data, in this instance, the service is able to return an identity of that individual (in this case, "John Smith") and a confidence level (in this case, 0.42). In this example, because an object was detected, a bounding box 604 may be overlaid on the frame 600 highlighting the presence of an object (face) that may be identifiable. However, because the identity returned by the third party facial identification service has a confidence score below a preset threshold (e.g., 0.5, but which is tunable by a user according to achieve the desired accuracy/thoroughness of identification) no identity of the user is associated with the recognized object, and no identity is therefore displayed.

Figure 7:
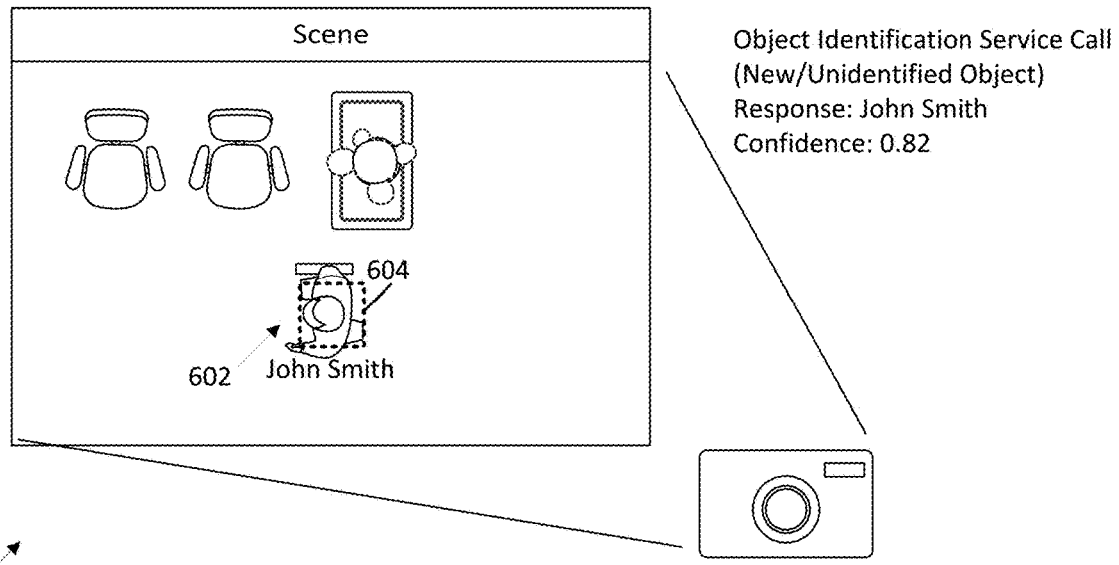
FIG. 7 illustrates a third frame of image content captured of a scene, which may be processed using an object or facial identification service.

Referring to FIG. 7, a further subsequent frame 700 is depicted, showing the same general scene at a time after frame 600 is captured. As can be seen in FIG. 7, the individual 602 has moved to a new position within the frame 700. The individual 602 is detected in the subsequent frame 700 as an object via use of an object detection process, as described above. However, that individual may be determined to be the same unidentified object as in frame 600, e.g., due to use of a Kalman filter which is used to track movement of objects between adjacent video frames. Accordingly, a bounding box 604 may be persisted around the individual 602.

In the example of FIG. 7, because the individual 602 was not detected with adequate confidence (based on the selected threshold) in the previous frame, a further call to the third party facial identification service is made. In this instance, an identity of the individual is provided (again, "John Smith") and a confidence level (in this case, 0.82). Because the confidence in the identification is above a predetermined threshold (0.5 in this example, as noted above), the returned identification may be determined to be "accurate" and the user identification may be associated with the detected facial object. Accordingly, alongside the bounding box 604, a user identity label may be displayed in the frame during playback, identifying the individual.

Figure 8:
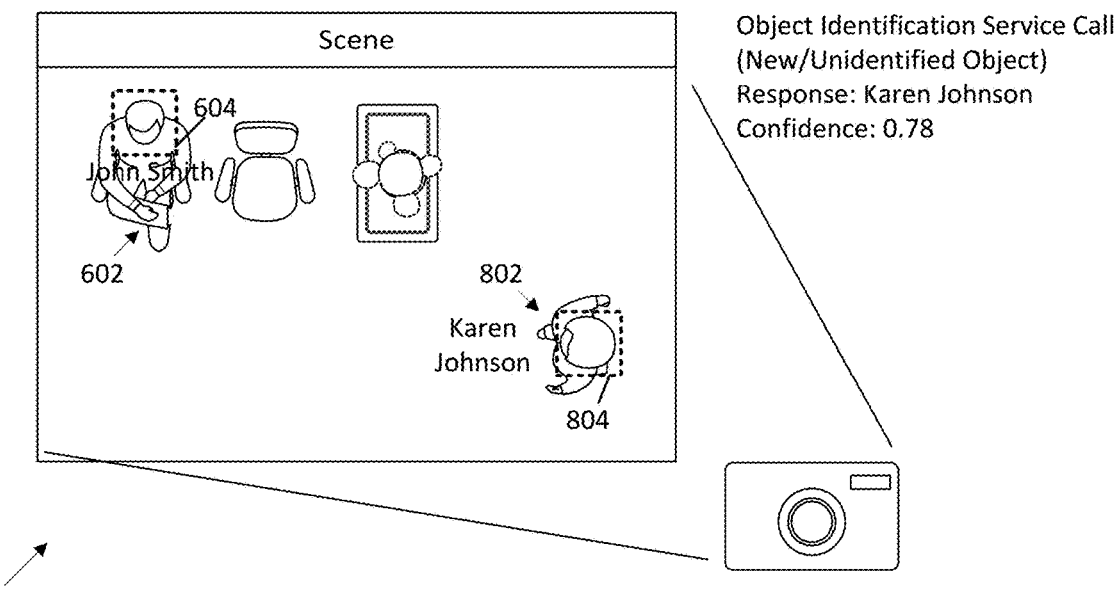
FIG. 8 illustrates a fourth frame of image content captured of a scene, which may be processed using an object or facial identification service.

Referring to FIG. 8, a still further subsequent frame 800 is depicted, showing the same general scene at a time after frame 700 is captured, but within a threshold time between which identification calls are made. In this example, the individual 602 has continued to a third position within the captured scene, but will continue to be identified despite requiring no further calls to a third party object identification service. This is because the individual 602 is tracked, for example via use of a Kalman filter, through the sequence of captured frames as being the same object, and the object identification call occurring in conjunction with frame 700 of FIG. 7 has not yet expired. Accordingly, calls to the third party facial identification service for the individual 602 may be avoided in frame 800 (and any frames between frame 700 and frame 800).

In the frame 800, a second individual 802 has entered the scene, and is detected as the presence of a further facial object. Accordingly, a call to the third party facial identification service is made with respect to that individual 802, providing at least a portion of the image data of the frame 800 to the service that includes the individual 802. A bounding box 804 may be overlaid on the frame 800 based on detection of the individual. Based on the third party facial identification service identifying the individual (in this case, as "Karen Johnson") having a confidence level above a threshold (in this case, 0.78 being above the 0.5 threshold previously noted by way of example), the bounding box 804 may be labeled with the identity of the individual.

Figure 9:
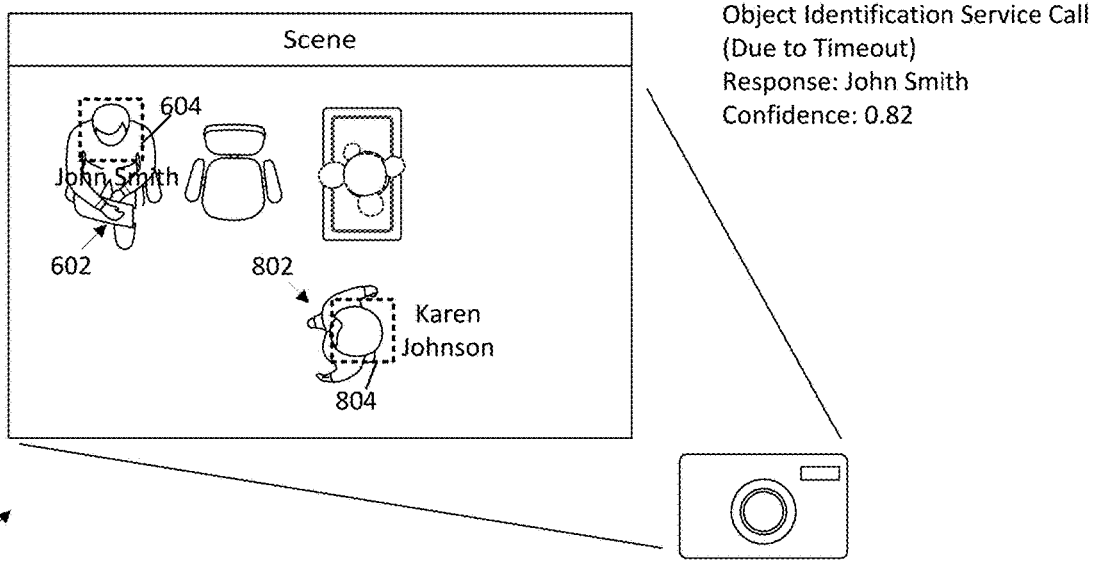
FIG. 9 illustrates a fifth frame of image content captured of a scene, which may be processed using an object or facial identification service.

Referring to FIG. 9, a still further frame 900 is depicted, showing the same general scene at a time after frame 800 is captured, and outside of a threshold time since individual 602 was identified. In this instance, while in frame 800 the individual 802 was identified via the third party facial identification service and individual 602 did not need to be re-identified because of a previous identification (thereby avoiding a third party service call), in this example, individual 602 has continued to move within the frame, but also has remained identified for a particular amount of time t, corresponding to a time between when frame 700 and frame 900 were captured. In some examples, time t is configurable, and can typically be set in the range of 2-10 seconds (five seconds in the example above). Accordingly, while individual 804 is tracked to a new position via motion detection and motion tracking via use of Kalman filter and does not need re-identification via the third party facial identification service, individual 602 must be re-identified because a time threshold is exceeded (e.g., at operation 410 of FIG. 4). Accordingly, a renewed call to third party facial identification service is made, and individual 602 is re-identified. Notably, as shown in frame 900, the re-identification of individual 602 has a confidence above the determined threshold, and therefore the identification of that individual remains adjacent to bounding box 604.

Figure 10:
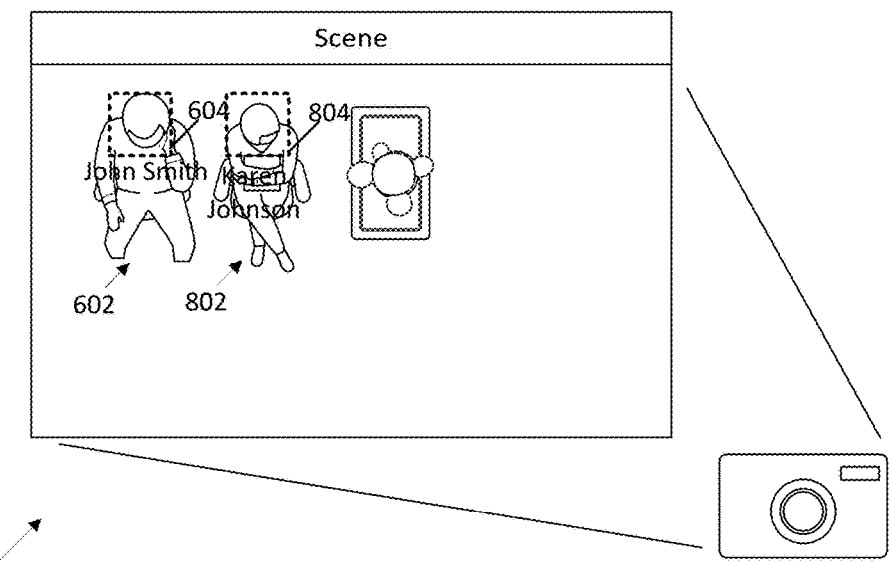
FIG. 10 illustrates a sixth frame of image content captured of a scene, which may be processed using an object or facial identification service.

Referring to FIG. 10, a further frame 1000 is depicted, showing the same general scene at a time after frame 900 is captured. In this instance, both individuals 602, 802 have been identified, but continue to move within the frame. Nevertheless, both individuals do not require re-identification, thereby avoiding further calls to a third party facial identification service, but instead simply relying on the less computationally-intensive facial detection processes that may be performed locally at an image capture system and/or a processing server.

Referring now to FIGS. 1-10 generally, it is noted that the object identification system equipped to reduce the number of service calls for remote object identification lookups described herein provide advantages over existing object identification techniques. For example, such computing environments do not require the object identification service to call a third party object identification service to identify an object detected in a frame of image content in every frame that object appears. Additionally, the process described herein is tunable by adjusting the confidence level that is required for object identification as well as the maximum time period that is allowable between two calls to the identification service. While calls of greater frequency may provide improved accuracy, less-frequent calls may be determined to be adequate for some applications. Accordingly, the object identification server reduces the number of object identification requests, which overalls improves the flexibility and efficiency of identifying objects in image data, without unnecessary usage of computing resources. Such effective identification disclosed is essential when dealing with a wide range of identification processes in the context of facial identification, such as boarding a plane, accessing a building, or recognizing significant individuals.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

We claim:

1. An object identification management server comprising:
   a processor;
   a memory operatively storing instructions which, when executed by the processor, implement an object identification service configured to:
      execute an object detection algorithm on each frame of video content to detect objects that appear within the frame;
      for each frame in which an object is detected:
         determine whether the object corresponds to an identified object present in a preceding frame using an object tracking algorithm;
         based at least in part on a determination that the object is not identified in a preceding frame:
            call a remote object identification interface to obtain an identification of the object; and
            based on receiving the identification of the object, associate the identification of the object with the object in the frame; and
         based at least in part on a determination that the object was present and identified in the preceding frame, associate an identification of the object from the preceding frame with the object in the frame without requiring the object identification service to call the remote object identification interface to identify the object in the frame.

2. The object identification management server of claim 1, wherein the object is a face of a person, and the remote object identification interface provides a facial identification service.

3. The object identification management server of claim 2, wherein calling the remote object identification interface includes transmitting a request to a remote API.

4. The object identification management server of claim 3, further comprising receiving a setting of a tunable threshold, wherein the tunable threshold adjusts the number of identification requests transmitted to the remote object identification interface.

5. The object identification management server of claim 4, wherein the tunable threshold determines a maximum time length between requests sent to the remote object identification interface.

6. The object identification management server of claim 2, wherein the object identification service is further configured to associate metadata with each frame of the video content, the metadata including an identification of the person and a confidence level in the identification of the person.

7. The object identification management server of claim 2, wherein the object identification service receives a unique identification for each person identified in the video content from the remote object identification interface.

8. The object identification management server of claim 2, wherein the object identification service is further configured to provide to the remote object identification interface one or more identities, the one or more identities, including a representative image of a person and a label of the person.

9. The object identification management server of claim 8, wherein the label of the person comprises a name of the person.

10. The object identification management server of claim 1, wherein the object identification service is further configured to receive the video content from one or more real-time video streams.

11. The object identification management server of claim 1, wherein the one or more real-time video streams are received from security cameras.

12. A facial identification system useable to identify persons appearing within video content, the object identification system comprising:
   a computing system having a communication interface, a memory, and a processor, the memory storing instructions which, when executed by the processor, implement a facial identification service configured to:
      execute an object detection algorithm on each frame of video content to detect objects that appear within the frame, the objects including at least one face object representative of a face of a person;
      for each frame:
         based on detection of a face object within the frame, determine whether the face object corresponds to an identified face object present in a preceding frame using an object tracking algorithm;
         based at least in part on a determination that the face object is not identified in the preceding frame:
            call a remote facial identification interface to obtain an identification of a person based on the face object; and
            based on receiving the identification of the person, associate the identification of the person with the face object; and
         based at least in part on a determination that the face object was present and identified in the preceding frame, associate the face object with the identification of the person without requiring the remote facial identification interface to be called in response to detection of the face object within the frame.

13. The facial identification system of claim 12, wherein the object tracking algorithm comprises applying a Kalman filter to track object movements between frames of the video content.

14. The facial identification system of claim 12, wherein the object detection algorithm comprises a facial detection algorithm.

15. The facial identification system of using claim 12, wherein the facial identification service tracks a similarity between the frame and the preceding frame in an area of the frame, including the at least one face object.

16. The facial identification system of using claim 12, wherein the facial identification service is configured to receive, from the remote facial identification interface, a confidence level associated with a closest facial identification result.

17. The facial identification system of using claim 12, wherein the facial identification service is configured to transmit a new identification request at user-definable time increments.

18. The facial identification system of using claim 12, wherein the facial identification service periodically transmits a new identification request to the remote facial identification interface irrespective of whether the face object is identified in the preceding frame.

19. A computer-implemented method for transferring data from an entity to a processing server comprising:
   receiving video data generated from the entity's video capture system;
   comparing accessible records owned by the entity provided to the third-party from previously provided photos;
   performing an object detection algorithm on each frame of video content for detecting objects appearing within the frame, the objects including at least one face object representative of a face of a person;
   for each frame:
      based on detection of a face object within the frame, determining whether the face object corresponds to an identified face object present in a preceding frame using an object tracking algorithm;
      based at least in part on a determination that the face object is not identified in the preceding frame:
         calling a remote facial identification interface to obtain an identification of a person based on the face object; and
         based on receiving the identification of the person, associate the identification of the person with the face object; and
      based at least in part on a determination that the face object was present and identified in the preceding frame, associate the face object with the identification of the person without requiring the remote facial identification interface to be called in response to the detection of the face object within the frame.

20. The computer-implemented method for transferring data from an entity to the processing server of claim 19, wherein a client's mobile device is provided modified video data including the initial video data with an overlay identifying at least one person appearing in the video data based on the identification received from the remote facial identification interface.

21. The computer-implemented method for transferring data from an entity to the processing server of claim 19, wherein a client's mobile device is provided modified video data including the initial video data with an overlay identifying at least one person appearing in the video data that is unidentified based on the lack of identification received from the remote facial identification interface.

22. The computer-implemented method for transferring data from an entity to the processing server of claim 19, wherein video data is at least displayed on the client's mobile device remotely from the processing server.

* * * * *